TERMINAL TUBE LOCATING APPARATUS

Original Filed July 17, 1956

INVENTOR.
ALBERT ZACK
BY
Kenway, Jenney + Hildreth
ATTORNEYS

3,067,497
TERMINAL TUBE LOCATING APPARATUS

Albert Zack, Danvers, Mass., assignor to Sylvania Electric Products Inc., a corporation of Delaware Original application July 17, 1956, Ser. No. 598,342, now Patent No. 2,999,990, dated Sept. 12, 1961. Divided and this application Dec. 21, 1960, Ser. No. 77,381
6 Claims. (Cl. 29—203)

This invention relates in general to wafer coils and in particular to improved apparatus and tools for the manufacture of such coils. The present application is a division of my co-pending application entitled Wafer Coil, Serial No. 598,342, filed July 17, 1956, now Patent No. 2,999,990.

Wafer coils are constructed usually by winding together thin sheets of metal foil and insulating material to form an elongated roll. In the winding operation, small metallic tubes, usually of copper, are incorporated in the roll. Two such copper tubes are bonded to the metal foil by means of solder or other conductive sealing material, one to the leading edge and one to the trailing edge of the foil. The roll is then sliced into wafers and there remain terminal holes at the beginning and end of the wafer coil formed by the internal walls of the two lengths of copper tubing which were originally incorporated in the roll. It is then possible to solder or otherwise attach terminal lead wires in the openings thus formed at the ends of the coil.

In the past, the core on which the roll is formed has been made in the form of a cylinder having a flattened side. The originating copper tube was laid against the flat side of the cylinder, and as the layers of foil and insulating material were wrapped about the assembly, a substantially cylindrical roll resulted. Unfortunately, however, the copper tube was free to move laterally against the flat side of the cylinder often in such a fashion that the axis of the tube would be at an angle to the axis of the cylinder. Thus, when wafer coils were sliced from the roll, some had the originating opening centered on the flat side of the cylinder, others were displaced either to one side or the other.

Further problems arose in attaching the terminating tube to the trailing edge of the foil. The usual procedure was to align the terminating tube with the originating tube by eye. Unfortunately, however, when wafer coils were sliced from the roll, the desired condition of both terminal openings lying on a diameter of the coil was not achieved.

Although wafer coils made by the method described were useful devices for the purposes intended, a serious problem arose when it was desired to place the wafer coils on an automatic machine for subsequent processing operations such as lead soldering. It is necessary that there be only reasonable tolerances in the spacing and orientation of the originating and terminating holes when an automatic machine is used to solder leads to the coils. In other words, the openings in each wafer coil must correspond within certain limits to those of all other wafer coils and to the dimensions of machine components designed to hold the wafer coils and the leads to be soldered to the wafer coils. As has been pointed out, the necessary accurate spacing and orientation of coils made in the manner described above could not be attained. It is with this problem that the present invention is concerned.

The primary object of the present invention is the improvement of apparatus and tools for the manufacturing of wafer coils.

Another object of the present invention is to simplify the process and technique of fabricating wafer coils.

Still another object of the invention is to provide apparatus for the manufacture of wafer coils which are uniform in their physical characteristics and dimensions.

In general, the present invention consists in a mandrel for constructing wafer coils having a re-entrant curved channel. The channel serves to locate and provide room for an originating connector tube and also serves as a reference for the positive location of a terminating connector tube. The apparatus is adaptable to machinery which is utilized in actually wrapping the roll from which wafer coils are sliced. For a better understanding of the present invention together with other objects, features and advantages, reference should be made to the following detailed description of a preferred embodiment thereof selected for purposes of illustration and shown in the accompanying drawings in which:

Figures 1, 2, 3:
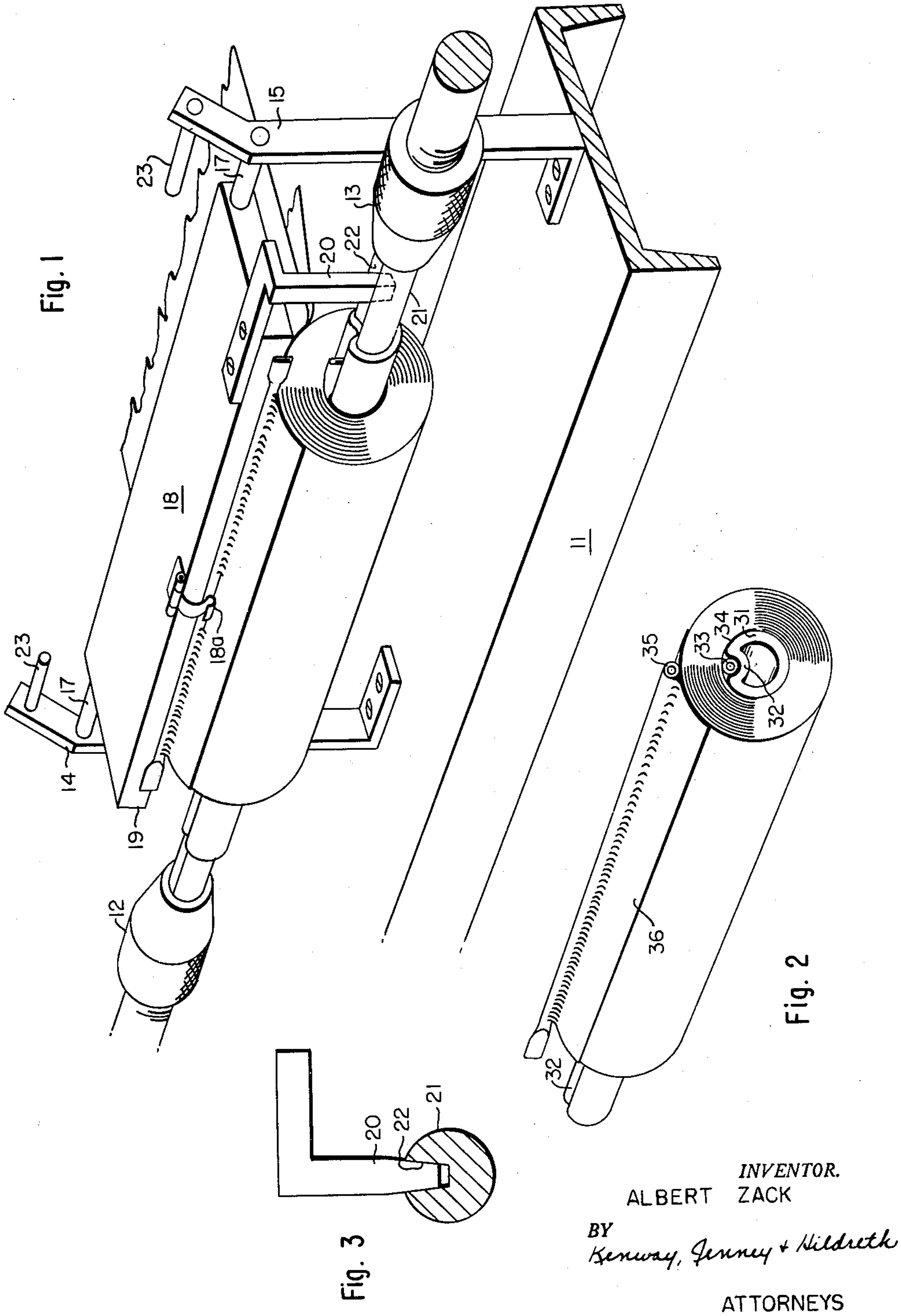
FIG. 1 is a perspective view of a coil wrapping machine, parts of which are shown fragmentarily and on which the terminating tube locating apparatus has been installed.
FIG. 2 is a perspective view of an elongated roll from which wafer coils are sliced, fabricated on the machine shown in FIG. 1.
FIG. 3 is a view in section showing one embodiment of the probe of the terminating tube locating apparatus.

In FIG. 1, there is shown a bed 11 of a wrapping machine which may actually be a modified lathe. A chuck 12 is shown at the left of bed 11 and may be supported from and rotatable by a head stock (not shown). A similar chuck 13 is at the right hand side of bed 11 and may be considered to be supported from and rotatable by a tail stock (not shown). Mounted directly on bed 11 are a standard 14 at the left and a similar standard 15 at the right. A pair of pivot pins 17 are rotatably supported by standards 14 and 15. A plate 18 is firmly attached to pivot pins 17 and has a spring clip 18*a* attached centrally above and extending over a straight edge 19. Adjacent the right front corner of plate 18 as it is shown in the drawing, there is attached a locating probe 20. Locating probe 20 is generally L-shaped and extends downwardly from plate 18. A mandrel 21 is supported between chucks 12 and 13 and has a radial channel-like groove running its entire length as will be explained in greater detail hereinafter. In addition to the longitudinal channel, mandrel 21 has a tapered opening 22 formed at one point in the longitudinal channel. The tapered opening 22 is centered transversely of mandrel 21 in the same manner as the longitudinal channel.

A pair of stops 23 are provided at the top of standards 14 and 15. When plate 18 is retracted from the position shown in FIG. 1, stops 23 hold it in a rest position out of the way of operations taking place on the wrapping machine.

In FIG. 2, there is shown an elongated roll from which several wafer coils have been sliced. At the exposed cut end of the roll, there may be clearly seen a core 31 which may be made of kraft paper or other material suitable for impregnation, for example, by wax. The longitudinal channel 32 formed in core 31 may be clearly seen at the cut end as well as beyond the further end of the roll from which core 31 extends. An originating connecting tube 33 lies in channel 32 which has a contour matching the outside surface of tube 33. Channel 32 and originating tube 33 are so proportioned that when they are assembled together and a length of material is wrapped about them, a roll of substantially circular cross-section results. When material such as aluminum is used as the conductor in the coils being formed, it is somewhat desirable to overlay the leading edge of the aluminum with a relatively short length of copper 34, which may, if desired, pass between tube 33 and channel 32. This facilitates soldering of originating tube 33 to the leading edge of the foil. In similar fashion, terminating connecting tube 35 may be placed on a copper trailer 36 which is attached to or overlies the trailing edge of the aluminum foil which is the conductive material in the coil. Such leaders and trailers are unnecessary when copper is used as the conductive material of the coil, and in fact need not be used when aluminum is the conductive material, but the soldering of terminal tubes is facilitated by such use.

In FIG. 3, there is shown one form which the locating probe 20 of the apparatus for setting the terminating tube may take. A mandrel 21 is provided with a tapered flat-sided radial opening 22. For purposes of accurate location, the opening 22 as shown has straight sides which extend to the periphery of the mandrel 21. It is unnecessary, however, that these sides extend in straight lines all of the way out to the periphery. It is sometimes preferable that the longitudinal channel be formed along the entire length of the mandrel 21 which results in the flat sides of opening 22 being cut off for some little distance in from the periphery. Locating probe 20 also has tapered straight sides which are designed to have a slide fit into the opening provided in mandrel 21.

In carrying out the teaching of the present invention, a core 31 is slipped over the mandrel 21 to which it conforms quite closely in shape. The mandrel is then mounted in chucks 12 and 13 of the wrapping machine. Supply reels of sheets of conductive and insulating material (not shown) are provided adjacent the wrapping machine. An originating tube 33 may then be laid in the longitudinal channel 32 of the core 31. If a leader such as 34 is to be used, it is then placed between the originating tube 33 and the channel 32. The leader is then soldered to originating tube 33. A sheet of conducting material is placed under or over the leader, a sheet of insulating material which is co-extensive with the conducting material is placed over the conducting material and the rotation of chucks 12 and 13 by a power source (not shown) is begun. The precise manner in which this sequence of operations is carried out is not critical. It is only necessary that good electrical connection be established between originating tube 33 and the sheet of conducting material, either directly or through the leader. It is also necessary, of course, that the leader be firmly maintained in position, when it is used, and it is sometimes desirable to use conductive paste between the leader and the foil to insure electrical contact. Subsequent turns of insulating material and conductive material are wrapped sufficiently tightly to assure firm location of the leader.

Rotation of the wrapping machine is continued until a plurality of turns have been built up forming an elongated roll. The number of turns is, of course, dependent upon the electrical characteristics desired in the final product. When a sufficient number of turns have been placed on the elongated roll, rotation is discontinued. Plate 18 which has been resting against stops 23 during the wrapping operation is then brought forward and down, and the position of mandrel 21 is adjusted by manual chuck rotation until locating probe 20 drops into the tapered opening 22 in the mandrel 21. Straight edge 19 is spaced from the standards 14 and 15 a sufficient distance such that when a terminating tube 35 is placed in position against straight edge 19, it lies in a vertical plane running through originating tube 33 and is maintained there by spring clip 18*a*. If a trailer 36 is to be used, it may first be placed in position on the conducting sheet. Terminating tube 35 is held firmly against straight edge 19 by spring clip 18*a*, and it is then soldered either to the conducting sheet or trailer 36. At this point, the conducting sheet may be cut, and a few additional turns of material may be placed over the entire assembly to lock trailer 36 in position. Alternatively, trailer 36 may be sealed by a conducting material to the conducting sheet (as also may leader 34).

The entire roll and mandrel may be removed from chucks 12 and 13 at this point. The mandrel 21 is slipped from the core 31, and the elongated roll is ready for further processing and slicing into wafer coils. The wafer coils sliced from the roll may also be subjected to further processing including the soldering of leads to the terminal openings provided by the internal walls of the copper tubing. The openings in coils formed in the manner taught in the present invention are then spaced and oriented accurately and consistently. Each pair of openings lies in a diametrical plane taken through the longitudinal axis of the roll.

The winding technique described is adaptable to numerous modifications with which the present invention is not concerned. However, the concepts of uniquely locating the originating and terminating connecting tubes which ultimately become the terminals of the wafer coils are believed to be novel. The formation of the mandrel and core with a re-entrant curved longitudinal channel and the use of that channel as the reference point for location of both originating and terminating tubes is believed to constitute an advance in the art which is of considerable significance because it permits the mechanization of subsequent processing operations particularly the soldering of leads to the wafer coils. The invention should not be limited to the precise embodiments shown as other devices falling within the purview of the invention will suggest themselves to those skilled in the art. By way of example, it might be possible to provide locating probes recessed in the longitudinal channel of the mandrel, which probes could be swung upwardly to provide a location for the terminating tube of the roll, referenced nonetheless from the longitudinal channel. The longitudinal channel might also be used as a reference point by working back through the chucks in which the mandrel is supported. A locating device for the terminating tube could then be arranged for cooperation with the chucks when the chucks are in the proper position. Because of these and other modifications which immediately suggest themselves, the invention should not be limited in any way by the embodiment disclosed, but only by the spirit and scope of the appended claims.

What is claimed is:

1. Apparatus for fabricating a wafer coil having at least a core and originating and terminating connecting tubes comprising a generally cylindrical mandrel having a longitudinal channel of re-entrant curved cross-sectional shape formed in the periphery thereof for receiving a similarly shaped portion of said core and said originating connecting tube, and means fixed with respect to the channel of said mandrel for holding said terminating connecting tube against the coil and in position to be affixing to said coil.

2. Apparatus for fabricating a wafer coil having at least a core and originating and terminating connecting tubes comprising a generally cylindrical mandrel having a longitudinal channel of re-entrant curved cross-sectional shape formed in the periphery thereof for receiving a similarly shaped portion of said core and said originating connecting tube, a straight edge, and a locating probe fixed to said straight edge, said mandrel including means for cooperating with said locating probe whereby said terminating connecting tube may be placed against said straight edge and oriented in a plane passing axially through said originating tube.

3. Apparatus as in claim 2 including means for pivotally supporting said straight edge, said supporting means being spaced from the axis of said mandrel.

4. Apparatus as in claim 2 wherein said mandrel has a straight-sided tapered recess formed therein and said locating probe has a straight-sided tapered end for engagement in said recess.

5. In combination with a machine for wrapping elongated rolls to be sliced into wafer coils, apparatus for locating the originating and terminating connecting tubes for said rolls comprising a generally cylindrical mandrel, a pair of rotatable chucks for holding the ends of said mandrel, said mandrel having a longitudinal channel of re-entrant curved cross-sectional formed in the periphery thereof and a tapered recess formed at a point in said channel, a pair of standards mounted on said wrapping machine at a predetermined distance from said chucks, a plate having a straight edge pivotally secured to said standards, and a locating probe attached to said plate, whereby pivotal movement of said plate to bring said locating probe into said recess places said straight edge adjacent and parallel to a plane through the axis of said originating connecting tube for locating said terminating connecting tube with its axis in said plane.

6. Apparatus as in claim 5 wherein said recess has tapered flat sides and said locating probe has a tapered flat-sided end for slidable engagement in said recess.

References Cited in the file of this patent

UNITED STATES PATENTS

| | | |
|---|---|---|
| 165,934 | Knapp | July 27, 1875 |
| 749,971 | Nordhoff | Jan. 19, 1904 |
| 2,613,255 | Kahn | Oct. 7, 1952 |